(12) United States Patent
Kuschke et al.

(10) Patent No.: US 7,865,648 B2
(45) Date of Patent: Jan. 4, 2011

(54) MODULAR DATA TRANSMISSION SYSTEM WITH SEPARATE ENERGY SUPPLY FOR EACH CONNECTED MODULE

(75) Inventors: Detlev Kuschke, Schieder-Schwalenberg (DE); Johann Derksen, Brakel (DE); Michael Hoffmann, Oerlingshausen (DE); Stephan Grewe, Lemgo (DE); Dominik Weiss, Aerzen (DE)

(73) Assignee: Phoenix Contact GmbH & Co. KG (DE)

( * ) Notice: Subject to any disclaimer, the term of this patent is extended or adjusted under 35 U.S.C. 154(b) by 84 days.

(21) Appl. No.: 12/335,633

(22) Filed: Dec. 16, 2008

(65) Prior Publication Data

US 2009/0157937 A1 Jun. 18, 2009

(30) Foreign Application Priority Data

Dec. 18, 2007 (DE) .................. 10 2007 061 610

(51) Int. Cl.
*G06F 13/00* (2006.01)
(52) U.S. Cl. ...................... 710/300; 361/729
(58) Field of Classification Search ......... 710/300–302; 361/600, 736, 729
See application file for complete search history.

(56) References Cited

U.S. PATENT DOCUMENTS 5,958,030 A * 9/1999 Kwa ..................... 710/300

6,430,069 B1 * 8/2002 Drobnik ................. 363/68
2007/0057785 A1 * 3/2007 Lee ....................... 340/541

FOREIGN PATENT DOCUMENTS

| DE | 199 17 597 A1 | 10/2000 |
| DE | 296 24 219 U1 | 3/2001 |
| EP | 1 447 829 A1 | 8/2004 |
| EP | 1 519 393 A2 | 3/2005 |
| EP | 1 764 873 A1 | 3/2007 |
| EP | 1 885 085 A1 | 2/2008 |
| WO | 2006027336 A1 | 3/2006 |

OTHER PUBLICATIONS

"European Search Report for International Application No. 08020816.8-1231", Aug. 5, 2010, Publisher: Euroepan Patent Office.

* cited by examiner

*Primary Examiner*—Clifford H Knoll
(74) *Attorney, Agent, or Firm*—DeMont & Breyer, LLC

(57) ABSTRACT

The invention pertains to a modular data transmission system with several modules or bus nodes that can be arranged adjacent to one another in a row. The data transmission system comprises a first bus node that features a first transmitter for the wireless transmission of data and an electrical connector, as well as a second bus node that features a first receiver for the wireless reception of data and an electrical connector. Both bus nodes are detachably fixed on a mounting rail such that they are arranged adjacent to one another in a row. The first and second bus nodes are respectively detachably connected to a bus receptacle, wherein each bus receptacle features an electrical mating connector that is coupled to the electrical connector of the respective bus node in the connected state in order to transmit energy, as well as a positioning device for positioning the respective bus node.

13 Claims, 3 Drawing Sheets

MODULAR DATA TRANSMISSION SYSTEM WITH SEPARATE ENERGY SUPPLY FOR EACH CONNECTED MODULE

FIELD OF THE INVENTION

The invention pertains to a modular data transmission system with several modules or bus nodes that can be arranged adjacent to one another in a row.

BACKGROUND OF THE INVENTION

A bus system of this type is known, for example, from DE 296 24 219 U1. The bus system contains several bus nodes that are arranged adjacent to one another in a row and snapped onto a mounting rail. The bus nodes feature coupling devices that make it possible to realize contactless data transmission between the bus nodes. Each bus node features electrical contacts for connection to a power supply unit.

In a modularly designed control system known from DE 196 40 367 A1, the energy supply of the modules and the transmission of information between the individual modules is realized electromagnetically. If a module fails or is removed, the modules that follow this module can no longer be supplied with energy and therefore can no longer be put into a defined state.

Another device for the wireless transmission of energy and/or data is known from DE 4 344 071 A1.

DE 103 45 048 A1 discloses a plug-in connector for producing a connection with a data transmission link over which data can be transmitted inductively.

SUMMARY OF THE INVENTION

The invention is based on the objective of developing a modular data transmission system that makes it possible to realize a reliable supply of energy to all modules and to ensure essentially error-free data transmission between the modules.

Another aspect of the invention consists of making available a modular data transmission system that supports high-speed data transmission, for example, at a rate of 200 Mbit/s.

One basic idea of the invention consists of respectively coupling the bus nodes of a modular data transmission system to a bus receptacle that positions the corresponding bus node with respect to the adjacent bus nodes. This ensures that the modules are precisely positioned relative to one another such that reliable contactless data transmission can be realized. The bus receptacles furthermore have the function of transmitting electrical energy from or to the respective bus nodes such that the bus nodes that remain after the failure of one bus node can still be supplied energy and therefore placed into a defined safety state such as, e.g., an emergency shutdown. At this point, it should be noted that the modular data transmission system may consist of a so-called local bus system that is installed, in particular, in switchgear cabinets. The modular data transmission system may in turn be connected to a field bus.

The aforementioned technical problem is solved with a modular data transmission system that comprises a mounting rail, a first bus node that features a first transmitter for the wireless transmission of data and an electrical connector, as well as a second bus node that features a first receiver for the wireless reception of data and an electrical connector. The first and second bus nodes are detachably fixed on the mounting rail such that they are arranged adjacent to one another in a row. The bus nodes are advantageously snapped onto the mounting rail in the form of clamping modules.

The first and second bus nodes are each connected to a bus receptacle in a detachable fashion. Each bus receptacle features an electrical mating connector that is coupled to the electrical connector of the given bus node in the connected state in order to transmit energy, as well as a positioning device for positioning the respective bus node. It should be noted that the terms "electrical connector" and "electrical mating connector" refer to connectors that are realized in such a way that they produce contacting or contactless connections such as, for example, inductive or capacitive connections in order to transmit energy.

In order to connect the data transmission system, for example, to a field bus, the first and/or the second bus node may feature interfaces for connecting the modular data transmission system to the field bus.

According to an advantageous additional refinement, the modular data transmission system contains at least one third bus node that features a first transmitter and a first receiver for the contactless transmission and the contactless reception of data, as well as an electrical connector. The at least one third bus node is arranged between the first and second bus nodes and is detachably fixed on the mounting rail. In addition, the at least one bus node is detachably connected to a bus receptacle featuring an electrical mating connector that is coupled to the electrical connector of the given bus node in the connected state in order to transmit energy, as well as to a positioning device for positioning the third bus node relative to the other bus nodes.

Depending on the design of the positioning device of the respective bus receptacle, each bus node may feature a positioning device that is realized complementarily thereto.

According to an advantageous design, the electrical connector of each bus node and the electrical mating connector of the respective bus receptacle produce a contactless or contacting plug-in connection for the transmission of energy.

In a contactless supply of energy to the bus nodes, the electrical mating connector of each bus receptacle features a sub-transmitter with a transmission coil and each bus node features a sub-transmitter with a receiving coil. The supply of energy via a magnetic path provides the advantage that the bus nodes can be electrically isolated from a backplane bus. This makes it possible to eliminate electrical isolation between the logic circuit and the peripheral components in the modules and bus nodes, respectively.

According to a particularly preferred embodiment, the mating connector of the bus receptacle also fulfills the function of the positioning device. For this purpose, a sub-transmitter of each bus receptacle features, for example, an E-shaped ferromagnetic core, where at least one leg of the E-shaped core forms the positioning device of the respective bus receptacle that cooperates with a complementary positioning device of the respective bus node. The sub-transmitter of each bus node contains a C-shaped ferromagnetic core.

In order to achieve a compact and space-saving design, the bus receptacle is detachably fixed on the mounting rail. The bus receptacles are advantageously arranged within the mounting rail.

In order to realize bidirectional data transmission between the bus nodes, the first bus node features a first receiver, the at least one third bus node features a transmitter and a second receiver and the second bus node features a first transmitter.

In order also to realize the contactless transmission of clock information for synchronizing the bus nodes in addition to bidirectional data transmission, the first bus node features a second transmitter, the at least one third bus node features a third transmitter and a third receiver, and the second bus node features a second receiver.

In order to ensure a reliable supply of energy to the bus nodes, at least one bus receptacle is connected to an external energy supply unit. If not all bus receptacles are connected to an external energy supply unit, at least a few bus receptacles that are arranged adjacent to one another in a row are electrically interconnected such that the energy can be distributed to the bus nodes that are not connected to a bus receptacle that is connected to an energy supply unit. Alternatively, at least one bus node may feature an energy supply unit. The bus nodes that do not feature their own energy supply unit receive their energy via the respective bus receptacles that are electrically interconnected for this purpose.

In order to realize high-speed transmission between the bus nodes, each transmitter and/or receiver of each bus node is respectively designed for transmitting or receiving differential signals.

Each transmitter of each bus node advantageously features a differential signal driver for driving an inductive or capacitive device. In addition, each receiver of each bus node is realized in the form of a differential signal receiver that is connected to an inductive or capacitive device.

According to an advantageous embodiment, the first, second and at least one third bus node may be designed identically.

BRIEF DESCRIPTION OF THE DRAWINGS

An embodiment example of the invention is described in greater detail below with reference to the enclosed drawings. They show.

DETAILED DESCRIPTION

Figure 1:
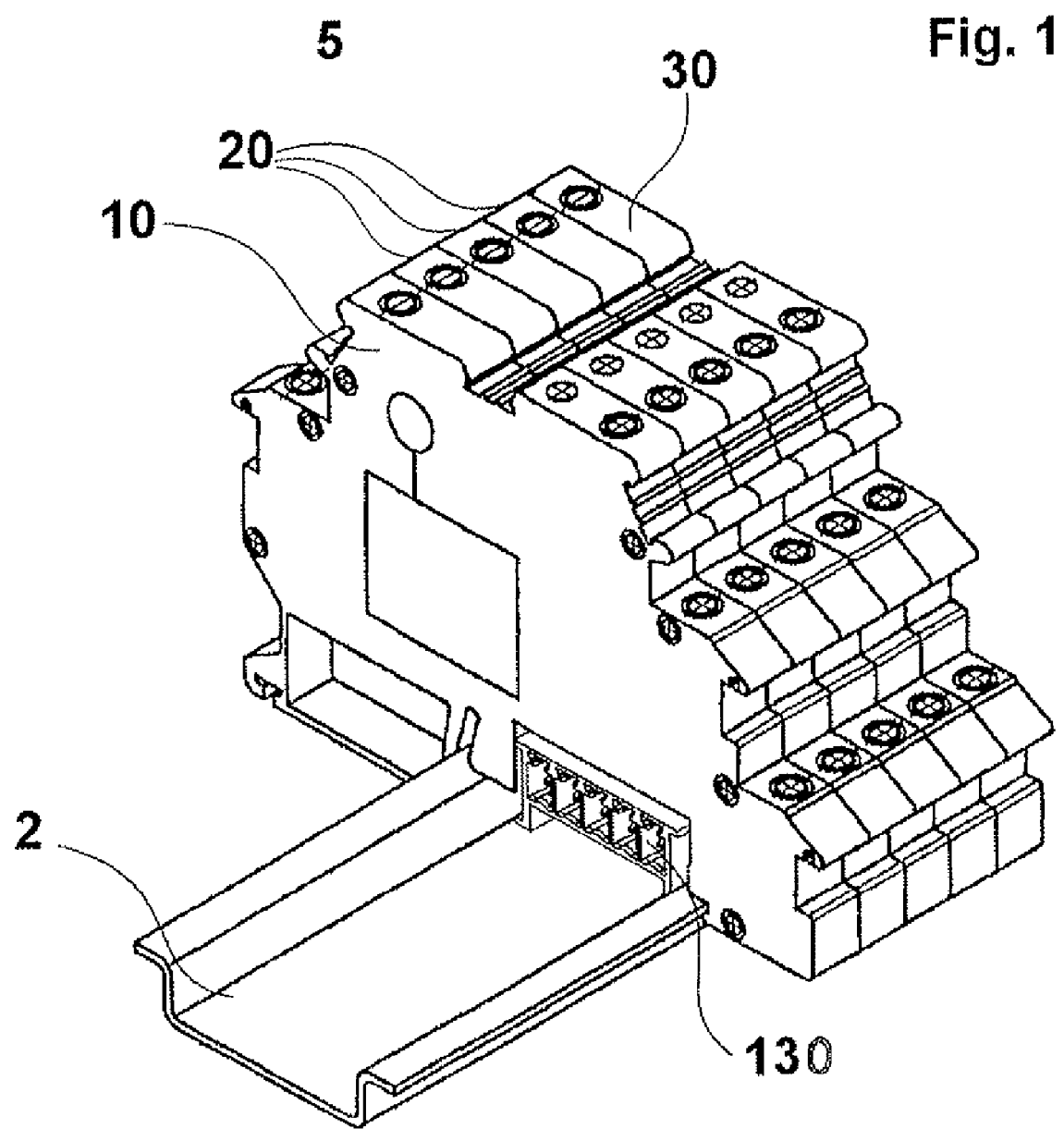
FIG. 1 a perspective representation of several bus nodes that are arranged adjacent to one another in a row on a mounting rail.

FIG. 1 shows an exemplary modular data transmission system 5 in the form of a local bus system that may be installed in a (not-shown) switchgear cabinet. The modular data transmission system 5 features a mounting rail 2 on which several bus receptacles are arranged. Only the bus receptacle 130 is partially visible in the figure. Several bus nodes are arranged on the mounting rail 2 laterally adjacent to one another in a row by being snapped onto the mounting rail 2. In this example, five bus nodes are snapped onto the mounting rail. Each bus node is mechanically and electromagnetically coupled to a bus receptacle in the snapped-on state. The bus receptacles serve for positioning the given bus nodes and supplying them with energy, as described in greater detail below. Other embodiments, in which energy is not supplied to each bus node via the bus receptacles, are also described in greater detail below. In the present example, the first outer bus node 10 on the left forms a boundary module and the outer bus node 30 on the right forms another boundary module. The bus nodes 20 located between them are referred to as intermediate modules. The two boundary modules 10 and 30 may feature connecting elements or interfaces for being connected to a field bus, for example, an Interbus S according to DIN 19258.

Data transmission between the bus nodes 10, 20 and 30 takes place wirelessly as described in greater detail below with reference to FIGS. 2 and 3. It should be noted that the individual bus nodes within the modular data transmission system 5 can fulfill different functions.

Figure 2:
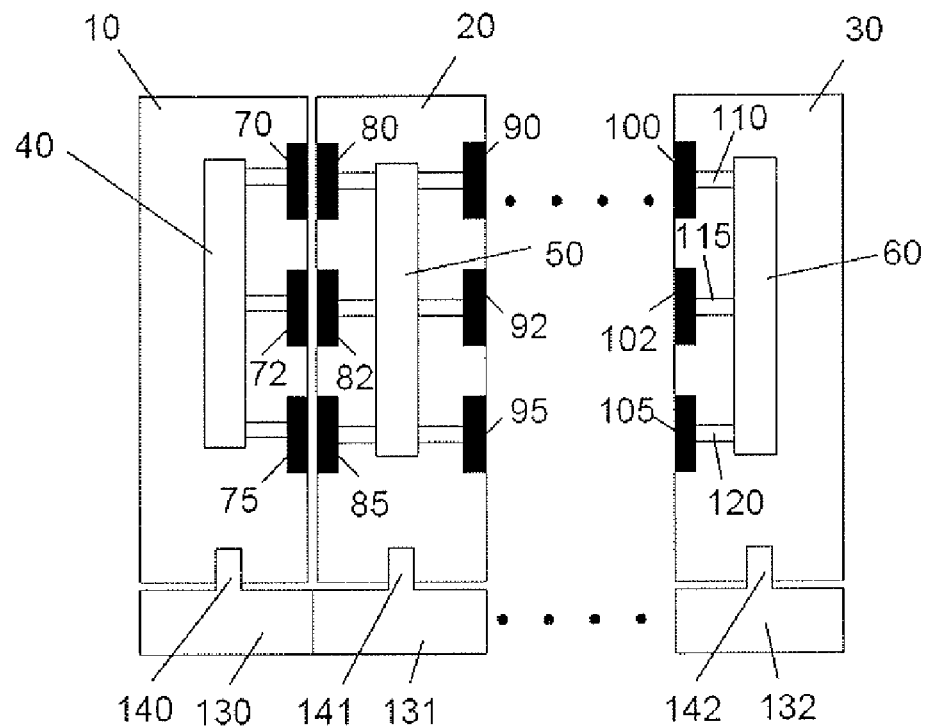
FIG. 2 a schematic top view of a number of bus nodes that are each connected to a bus receptacle, making it possible to realize an inductive data transmission.

In order to provide a better overview the schematic illustration of FIG. 2 shows only one of the intermediate modules 20 in addition to the two boundary modules 10 and 30. FIG. 2 also shows the bus node 10 connected to a bus receptacle 130, the bus node 20 connected to a bus receptacle 131, and the bus node 30 connected to a bus receptacle 132. The bus nodes 10, 20 and 30 are arranged side by side, where there may be a gap present between adjacent bus nodes. A gap may also be present between a bus node and an assigned bus receptacle.

The bus node 10, which functions as a boundary module, features a circuit 40 that is designed for transmitting and receiving differential signals. The circuit 40 features a transmission stage that can drive a transmission coil 70 with a differential signal. The transmission stage can also be referred to as a differential signal driver. In order to realize a bidirectional data exchange, the circuit 40 features a receiving stage that can receive and evaluate the differential signals arriving from a receiving coil 72. In order to transmit clock signals, the circuit 40 may feature another transmission stage that can drive a second transmission coil 75 with a differential signal. The transmission coils 70 and 75, as well as the receiving coil 72, are arranged on or in the vicinity of the right side wall of the bus node 10. Differential signals provide the advantage that the driving of the transmission coils 70 and 75, as well as the evaluation of the differential signals arriving from the receiving coil 72, can be realized more simply. In other respects, differential signals make it possible to realize a high data transmission rate.

The bus node 10 features a sub-transmitter that can cooperate with a sub-transmitter of the bus receptacle 130. In the connected state, the two sub-transmitters form an electromagnetic plug-in connection, which is described in greater detail below with reference to FIG. 4. The bus receptacle 130 furthermore features, for example, a positioning pin 140 that engages into a corresponding recess in the bus node 10.

The intermediate module 20 shown features a circuit 50 that is connected to a receiving coil 80, a transmission coil 82 and another receiving coil 85. The receiving coils 80 and 85, as well as the transmission coil 82, are arranged on or in the vicinity of the left side wall of the bus node 20 and in alignment with the transmission coils 70 and 75 and the receiving coil 72 of the bus node 10. The transmission of clock signals and the bidirectional transmission of data signals between the bus nodes 10 and 20 can thus be realized without contact, by means of inductive coupling in the described example. The circuit 50 consequently features a transmission stage that drives the transmission coil 82 with differential signals. The circuit 50 furthermore features two receiving components that can receive and correspondingly evaluate data signals and clock signals arriving from the receiving coils 80 and 85. The circuit 50 is also connected to a transmission coil 90, a receiving coil 92 and another transmission coil 95 that are arranged on or in the vicinity of the opposite side wall of the bus node 20. The circuit 50 features two additional transmission stages that drive the transmission coils 90 and 95 with differential signals. A receiving stage is provided in order to receive and evaluate the differential signals supplied by the receiving coil 92.

Analogously to bus node 10, bus node 20 also features a sub-transmitter that can cooperate with a sub-transmitter of bus receptacle 131. In the connected state, the two sub-transmitters form an electromagnetic plug connection, which is described in greater detail below with reference to FIG. 4. The bus receptacle 131 furthermore features, for example, a positioning pin 141 that engages into a corresponding recess in the bus node 20. It should be noted that the other intermediate modules 20 may be realized similarly to the above-described design.

The bus node 30 that also functions as a boundary module once again features a circuit 60 that is connected to a receiving coil 100, a transmission coil 102 and another receiving coil 105. The receiving coils 100 and 105, as well as the transmission coil 102, are arranged on or in the vicinity of the left side wall of the bus node 30, and are aligned with the transmission coils 90 and 95 and the receiving coil 92 of an adjacent bus node 20. The circuit 60 features a receiving coil that is able to receive and evaluate differential signals arriving from the receiving coil 100. Another receiving stage is designed for evaluating differential signals that arrive via receiving coil 105 and contain clock information for synchronization purposes. The circuit 60 furthermore features a transmission stage that can drive the transmission coil 102 with differential signals. The respective line pairs required for the transmission of differential signals are designated by reference symbols 110, 115 and 120.

Analogously to bus node 10, bus node 30 also features a sub-transmitter that can cooperate with a sub-transmitter of bus receptacle 132. In the connected state, the two sub-transmitters form an electromagnetic plug connection, which is described in greater detail below with reference to FIG. 4. The bus receptacle 132 furthermore features, for example, a positioning pin 142 that engages into a corresponding recess in the bus node 30.

The positioning devices 140, 141 and 142 of the respective bus receptacles 130, 131 and 132 and of the bus nodes 10, 20 and 30 may have such dimensions that an air gap is present between each coupled bus node and bus receptacle.

Figure 4:
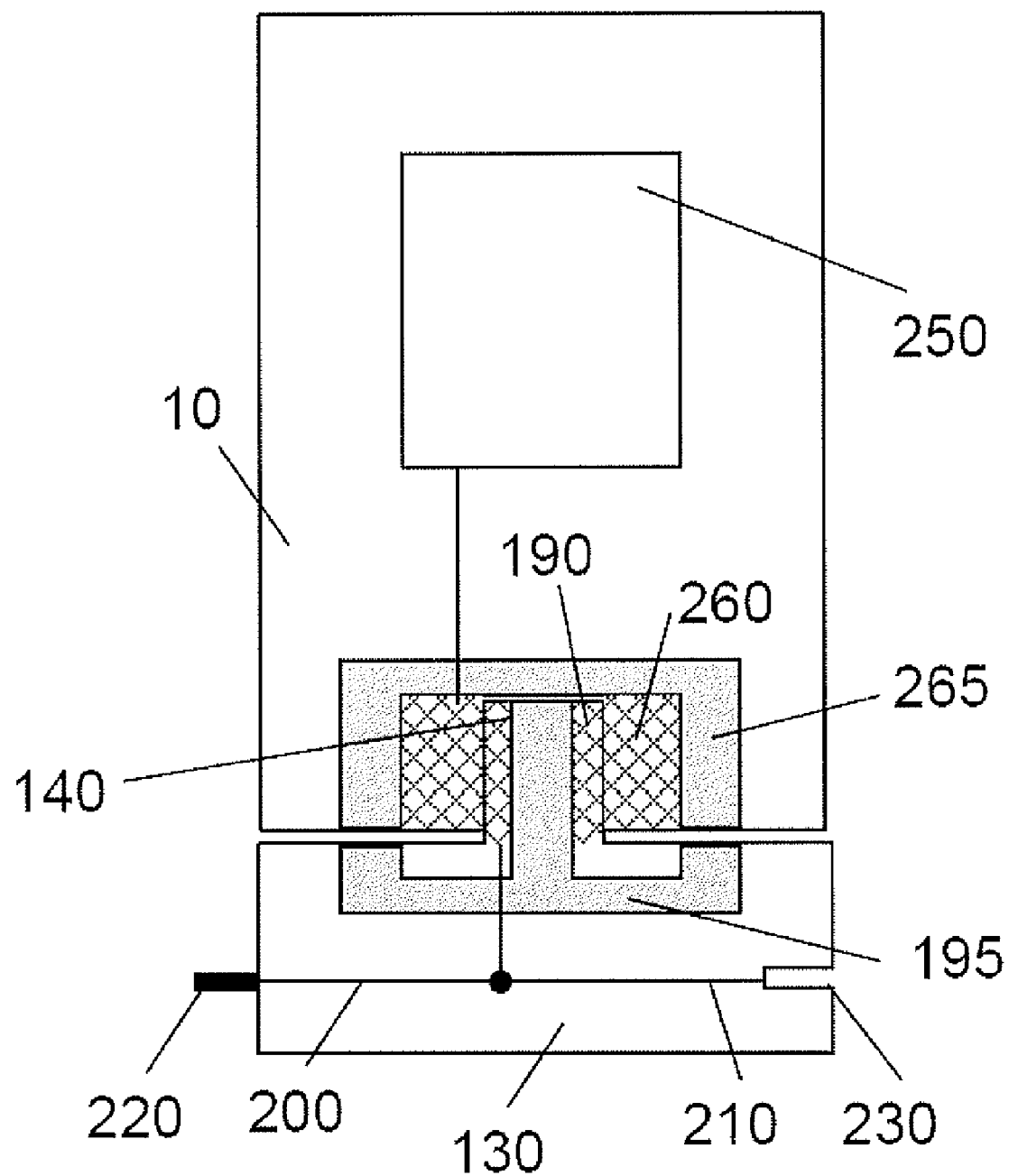

In one embodiment, only the bus node 10 illustrated in FIG. 2 contains an internal energy source 250 that is illustrated in FIG. 4. Here, the energy source 250 supplies not only the bus node 10 with energy, but also the remaining bus nodes 20 and 30. Consequently, the bus receptacles 130, 131 and 132 feature electrical contact elements for electrically interconnecting the bus receptacles and thus for distributing the energy supplied by the energy source to the remaining bus nodes 20 and 30. The corresponding contacts 220 and 230 are illustrated in FIG. 4. Due to these measures, the adjacently arranged bus receptacles function as a separate power bus.

It would also be conceivable, for example, for each boundary modules 10 and 30 to feature its own energy source in order to respectively supply one or more adjacent bus nodes with energy. For example, the energy source 250 of the bus node 10 supplies the directly adjacent bus node 20 with energy while the energy source of the bus node 30 supplies the remaining bus nodes 20 with energy. Due to these measures, groups of bus nodes are formed that are supplied with energy independently of one another. In the described example, the bus receptacle 130 assigned to the bus node 10 and the bus receptacle 131 assigned to the directly adjacent bus node 20 may be electrically interconnected. In addition, the bus receptacles of the bus nodes 20 that are supplied with energy by the energy source of the bus node 30 may be electrically interconnected. Two adjacent bus receptacles that belong to different groups need not be electrically interconnected. Instead of using one or more bus nodes with an internal energy source, it would also be possible to directly connect an external energy source to one or more bus receptacles. In this case, the bus receptacles may also be electrically interconnected in order to distribute the supplied energy to the bus nodes 10, 20 and 30.

Figure 3:
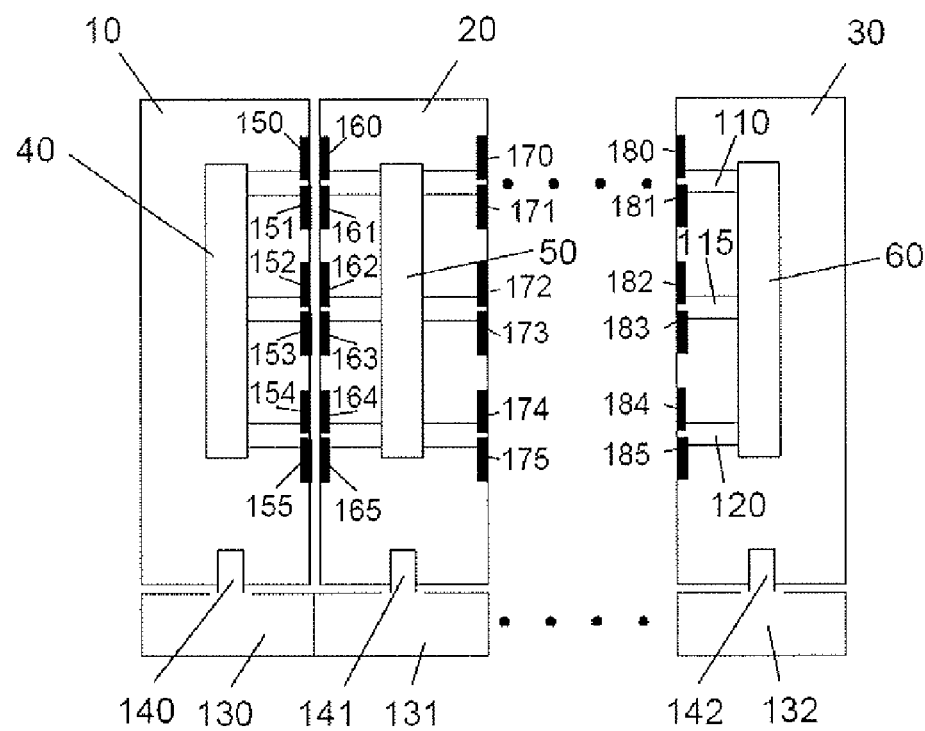
FIG. 3 a top view of a number of bus nodes that are each connected to a bus receptacle, making it possible to realize a capacitive data transmission, and FIG. 4 a schematic representation of an exemplary inductive plug-in connection between a bus receptacle and a bus node.

The exemplary embodiment illustrated in FIG. 3 merely differs from that illustrated in FIG. 2 in that the bus nodes 10, 20 and 30 are not coupled to one another inductively, but capacitively, in order to realize the contact-free transmission of data. For this purpose, capacitor plates are used instead of coils. Each bus node may once again be electromagnetically and mechanically coupled to a bus receptacle 130, 131, 132 by means of positioning pins 140, 141 and 142.

The bus node 10 that functions as a boundary module features a circuit 40 that is designed for transmitting and receiving differential signals. The circuit 40 features a transmission stage that can drive two capacitor plates 150, 151 with a differential signal. The two capacitor plates 150 and 151 may also be referred to as a capacitive transmitting device. In order to realize a bidirectional data exchange, the circuit 40 features a receiving stage that is able to receive and evaluate differential signals arriving from two capacitor plates 152, 153. The capacitor plates 152 and 153 may also be referred to as a capacitive receiving device. In order to transmit clock signals, the circuit 40 may feature another transmission stage that can drive the two capacitor plates 154, 155 with a differential signal. The capacitor plates 150 to 155 are arranged on or in the vicinity of the right side wall of the bus node 10.

The intermediate module 20 shown features a circuit 50. The circuit 50 contains a receiving stage that is connected to two capacitor plates 160, 161 functioning as a capacitive receiving device, a transmission stage that is connected to two capacitor plates 162, 163 functioning as a capacitive transmitting device, as well as another receiving stage that is connected to two additional capacitor plates 164, 165 functioning as a capacitive receiving device. The capacitor plates 160 to 165 are arranged on or in the vicinity of the left side wall of the bus node 20 and are in pair-wise alignment with respect to the capacitor plates 150 to 155 of the bus node 10. In other words, the capacitor plates 150 and 160, the capacitor plates 151 and 161, the capacitor plates 152 and 162, the capacitor plates 153 and 163, the capacitor plates 154 and 164 and the capacitor plates 155 and 165 may respectively form one capacitor.

The circuit 50 also features a transmission stage that drives two capacitor plates 170, 171 functioning as a capacitive transmitting device with differential signals. Furthermore, the circuit 50 features another receiving stage that is connected to two capacitor plates 172, 173 functioning as a capacitive receiving device. Another receiver device is connected to two capacitor plates 174, 175 functioning as another capacitive receiving device. The capacitor plates 170 to 175 are arranged on or in the vicinity of the opposite side wall of the bus node 20. The transmission of clock signals and the bidirectional transmission of data signals in the form of differential signals between the bus nodes 10, 20 and 30 can thereby be realized without contact by means of capacitive coupling in the described example.

The bus node 30 that also functions as a boundary module once again features a circuit 60. The circuit 60 contains a receiving stage that is connected to two capacitor plates 180 and 181 functioning as a capacitive receiving device, a transmission stage that is connected to two capacitor plates 182 and 183 functioning as a capacitive transmitting device, as well as another receiving stage that is connected to two capacitor plates 184 and 185 functioning as another receiving device. The capacitor plates 180 to 185 are arranged on or in the vicinity of the left side wall of the bus node 30 and in pair-wise alignment with respect to the respective capacitor plates 170 to 175 of an adjacent bus node 20. The first receiving stage is realized in such a way that it is able to receive and evaluate the differential signals arriving from the capacitor plates 180, 182. The other receiving stage is designed for evaluating the differential signals that arrive via the capacitor plates 184 and 185 and contain clocking information for synchronization purposes. The transmission stage is realized in the form of a differential signal driver for applying differential signals to the capacitor plates 180 and 181. The respective line pairs required for the transmission of differential signals are once again designated by reference symbols 110, 115 and 120. The bus nodes 10, 20 and 30 may also be supplied with energy as described above with reference to FIG. 2.

The data transmission systems illustrated in FIGS. 2 and 3 make it possible to transmit differential signals from the bus node 10 to the bus node 30 via the bus nodes 20 without contact, i.e., by means of inductive and capacitive coupling, respectively. Similarly, data in the form of differential signals can be transmitted from the bus node 30 to the bus node 10 via the bus nodes 20 without contact by means of capacitive or inductive coupling. Clock signals are also transmitted in the form of differential signals from the bus node 10 to the bus node 20 and to the bus node 30 without contact by means of inductive or capacitive coupling.

FIG. 4 shows an enlarged representation of the bus receptacle 130 and the lower section of the bus node 10, which is mechanically and electromagnetically coupled to the bus receptacle 130. At this point, it should be noted that the positioning device 140 of the bus receptacle and the socket-shaped positioning device in the bus node 10 that is realized complementarily thereto merely represent one preferred embodiment.

FIG. 4 shows one possible realization of a bus receptacle in the form of the bus receptacle 130. The sub-transmitter arranged in the bus receptacle 130 comprises an E-shaped ferromagnetic core 195 and a receiving coil 190 in the described example. The central leg of the E-shaped core element is realized in the form of a projection 140 and protrudes into a corresponding recess in the bus node 10. The length of the projection 140 and the depth of the corresponding recess in the bus node 10 are chosen such that there is an air gap between the bus receptacle 130 and the bus node 10. The receiving coil 190 is wound around the central leg 140 of the E-shaped core 195 that functions as a positioning device. If a bus node does not contain its own energy source, the coil 190 functions as a transmission coil that is supplied with energy by a not-shown external energy supply unit or by an adjacent bus receptacle. A C-shaped ferromagnetic core 265 is arranged in the lower section of the bus node 10, wherein both legs of this ferromagnetic core are aligned with the two outer legs of the E-shaped core 195 of the bus receptacle 130. A transmission coil 260 is recessed into the C-shaped core 265 and concentrically surrounds the receiving coil 190 of the bus receptacle 130. If a bus node does not contain its own energy source, the coil 260 functions as a receiving coil. The E-shaped ferromagnetic core 195 and the receiving coil 190 form the electromagnetic connector and the positioning device of the bus receptacle 130, whereas the C-shaped core 265 and the transmission coil 260 form the electromagnetic mating connector and the complementary positioning device of the bus node 10. Both connectors jointly form an electromagnetic plug-in connection. The energy supplied by the energy source 250 is transmitted to the bus receptacle 130 without contact by means of this electromagnetic plug-in connection. It is a matter of common knowledge that the E-shaped ferromagnetic core 195 and the C-shaped core 265 of the bus node that are separated by an air gap in the described example form a magnetic circuit for carrying the magnetic flux generated by the transmission coil 260 and, in turn, induces a corresponding voltage in the receiving coil 190. The receiving coil 190 of the bus receptacle 130 may be electrically connected to a contact pin 220 via a connecting line 200 and/or to a contact socket 230 via a connecting line 210. The bus receptacle 130 can be electrically connected to adjacent bus receptacles by means of the contact pin 220 and the contact socket 230 in order to supply the bus nodes with energy. The remaining bus receptacles 131 and 132 may also feature contact pins and/or contact sockets for this purpose. If the bus receptacle 131 merely features a contact pin that engages into the contact socket 230 of the bus receptacle 130, the energy source 250 of the bus node 10 only supplies the adjacent bus node 20 with energy via the bus receptacles 130 and 131. The remaining bus nodes 20 illustrated in FIG. 1 may be similarly supplied with energy by the energy source implemented in the bus node 30.

Since each bus node of the modular data transmission system 5 is connected to its own bus receptacle, each bus node is supplied with energy independently of the other bus nodes. If a bus node fails or is replaced, the remaining bus nodes are still supplied with energy and, depending on the implementation of the modular data transmission system 5, can be placed into a safe state such as, for example, an emergency shutdown.

It should be noted that the E-shaped core in the specific embodiment of the bus receptacle forms not only part of the electromagnetic connector, but also the positioning device of the bus receptacle 130. It would naturally also be conceivable that one or both outer legs of the E-shaped core 195 are realized in the form of a projection and form the positioning device instead of the central leg 140 of the core 195. In this case, corresponding recesses must be provided in the bus node 10. Alternatively or additionally, separate positioning devices that are realized, for example, in the form of pins may be provided on the upper face of the bus receptacle 130 in order to engage into complementary recesses in the bus node 10.

Instead of realizing a contactless electromagnetic plug connection, it would also be possible to provide corresponding contact elements in the bus node 10 and in the bus receptacle 130 in order to produce an electrical plug-in connection as soon as the bus node is attached to the bus receptacle.

What is claimed is:

1. A modular data transmission system comprising:
    a mounting rail,
    a first bus node that features a first transmitter for the wireless transmission of data and an electrical connector, and
    a second bus node that features a first receiver for the wireless reception of data and an electrical connector,
    wherein the first and second bus nodes are detachably fixed on the mounting rail such that they are arranged adjacent to one another in a row,
    characterized by
    a first bus receptacle to which the first bus node is detachably connected; and
    a second bus receptacle to which the second bus node is detachably connected;
    wherein each of the first and second bus receptacles features an electrical mating connector that is coupled to the electrical connector of the respective bus node in the connected state in order to transmit energy, as well as a positioning device for positioning the respective bus node; and wherein the first and second bus receptacles are detachably fixed on the mounting rail.

2. The modular data transmission system according to claim 1, characterized by a third bus node that features a first transmitter and a first receiver for the contactless transmission and the contactless reception of data, as well as an electrical connector, wherein the third bus node is arranged between the first and second bus nodes and is detachably fixed on the mounting rail, and wherein the third bus node is detachably connected to a third bus receptacle featuring an electrical mating connector that is coupled to the electrical connector of the respective third bus node in the connected state in order to transmit energy, as well as a positioning device for positioning the third bus node.

3. The modular data transmission system according to claim 2, characterized in that each of the first, second, and third bus nodes features a positioning device that is realized complementarily to the positioning device of the respective bus receptacle.

4. The modular data transmission system according to claim 2, characterized in that the electrical connector of each of the first, second, and third bus nodes and the electrical mating connector of the respective bus receptacle form a contactless or contacting plug-in connection for transmitting energy.

5. The modular data transmission system according to claim 4, characterized in that the electrical mating connector of each of the first, second, and third bus receptacles features a sub-transmitter with a transmission or receiving coil and each of the first, second, and third bus nodes features a sub-transmitter with a receiving or transmission coil.

6. The modular data transmission system according to claim 5, characterized in that the sub-transmitter of each of the first, second, and third bus receptacles features an E-shaped ferromagnetic core, wherein at least one leg of the E-shaped ferromagnetic core forms the positioning device of the respective bus receptacle that cooperates with a complementary positioning device of the respective bus node, and in that the sub-transmitter of each of the first, second, and third bus nodes contains a C-shaped ferromagnetic core.

7. The modular data transmission system according to claim 2, characterized in that the first bus node features a first receiver, the third bus node contains a second transmitter and a second receiver and the second bus node contains a first transmitter.

8. The modular data transmission system according to claim 7, characterized in that the first bus node features a second transmitter, the third bus node contains a third transmitter and a third receiver and the second bus node contains a second receiver.

9. The modular data transmission system according to claim 2, characterized in that at least one of the first, second, and third bus receptacles is connected to an external energy supply unit.

10. The modular data transmission system according to claim 2, characterized in that at least one of the first, second, and third bus nodes features an energy supply unit.

11. The modular data transmission system according to claim 9, characterized in that at least two of the first, second, and third bus receptacles are electrically interconnected in order to transmit energy.

12. The modular data transmission system according to claim 2, characterized in that each transmitter and/or receiver of each of the first, second, and third bus nodes is respectively designed for transmitting and receiving differential signals.

13. The modular data transmission system according to claim 12, characterized in that each transmitter of each of the first, second, and third bus nodes features a differential signal driver for driving an inductive or capacitive device, and in that each receiver of each of the first, second, and third bus nodes is realized in the form of a differential signal receiver that is connected to an inductive or capacitive device.

* * * * *